(12) United States Patent
Matsui

(10) Patent No.: US 7,252,392 B2
(45) Date of Patent: Aug. 7, 2007

(54) ILLUMINATION APPARATUS AND IMAGE PROJECTION APPARATUS USING THE ILLUMINATION APPARATUS

(75) Inventor: Shinzo Matsui, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 11/005,388

(22) Filed: Dec. 6, 2004

(65) Prior Publication Data

US 2005/0128436 A1 Jun. 16, 2005

(30) Foreign Application Priority Data

Dec. 16, 2003 (JP) .............................. 2003-418263

(51) Int. Cl.
*G03B 21/20* (2006.01)
*G03B 21/26* (2006.01)
*G03B 21/00* (2006.01)

(52) U.S. Cl. .............................. 353/85; 353/94; 353/31

(58) Field of Classification Search ................... 353/85, 353/94, 102, 31, 122
See application file for complete search history.

(56) References Cited

U.S. PATENT DOCUMENTS 6,227,669 B1 5/2001 Tiao et al.
6,318,863 B1 11/2001 Tiao et al.
2003/0076507 A1 4/2003 Fleury
2004/0041744 A1 3/2004 Inoue et al.
2004/0090602 A1* 5/2004 Imade ........................ 353/102

FOREIGN PATENT DOCUMENTS

| JP | 6-13652 | 1/1994 |
| JP | 10-293233 | 11/1998 |
| JP | 11-32278 | 2/1999 |
| JP | 2003-24275 | 1/2003 |
| JP | 2003-208991 | 7/2003 |

* cited by examiner

*Primary Examiner*—William C. Dowling
*Assistant Examiner*—Andrew Kong
(74) *Attorney, Agent, or Firm*—Volpe & Koenig PC

(57) ABSTRACT

An illumination apparatus which applies light from light emitting members to a region to be illuminated. The apparatus includes an emitted light quantity control unit which controls emitted light quantities of the members, and a light transmissibility changing unit which controls transmissibility of each light path which transmits output light of the light emitting member to the region. The controls of the emitted light quantity control unit and the light transmissibility changing unit are performed in such a manner that an illuminative light quantity in the region during intermittent lighting of a predetermined number of light emitting members which are some of the light emitting members at a driving current value larger than a rated current in a predetermined period is larger than an illuminative light quantity in the region during constant lighting of the predetermined number of light emitting members at a rated driving current in the predetermined period.

16 Claims, 10 Drawing Sheets

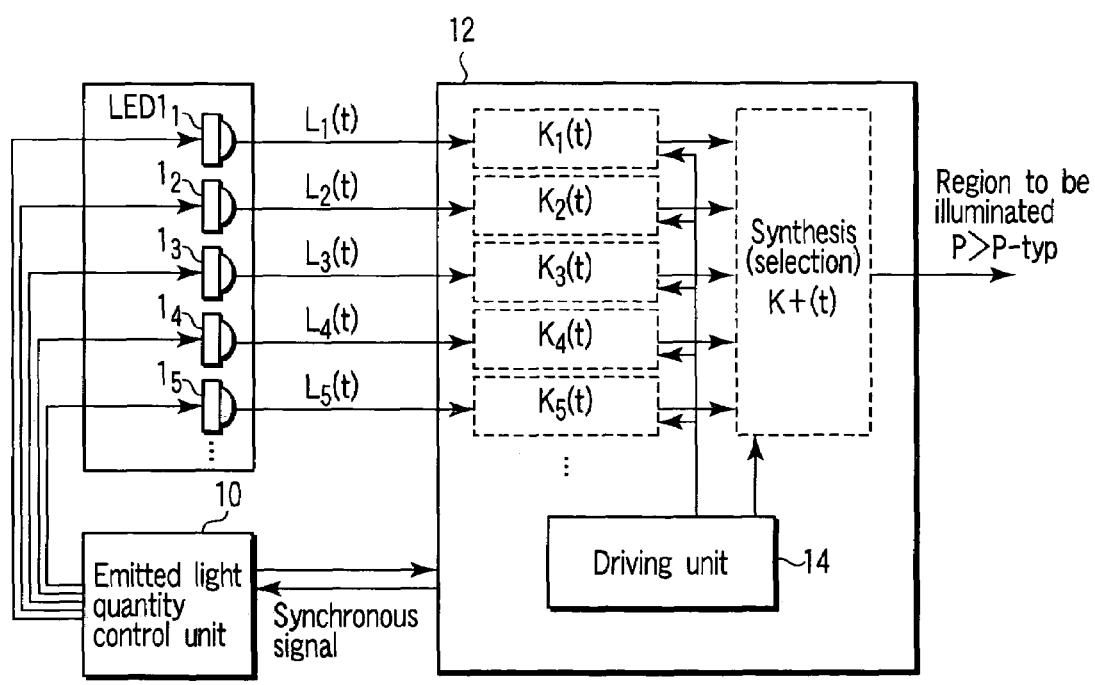
F I G. 2

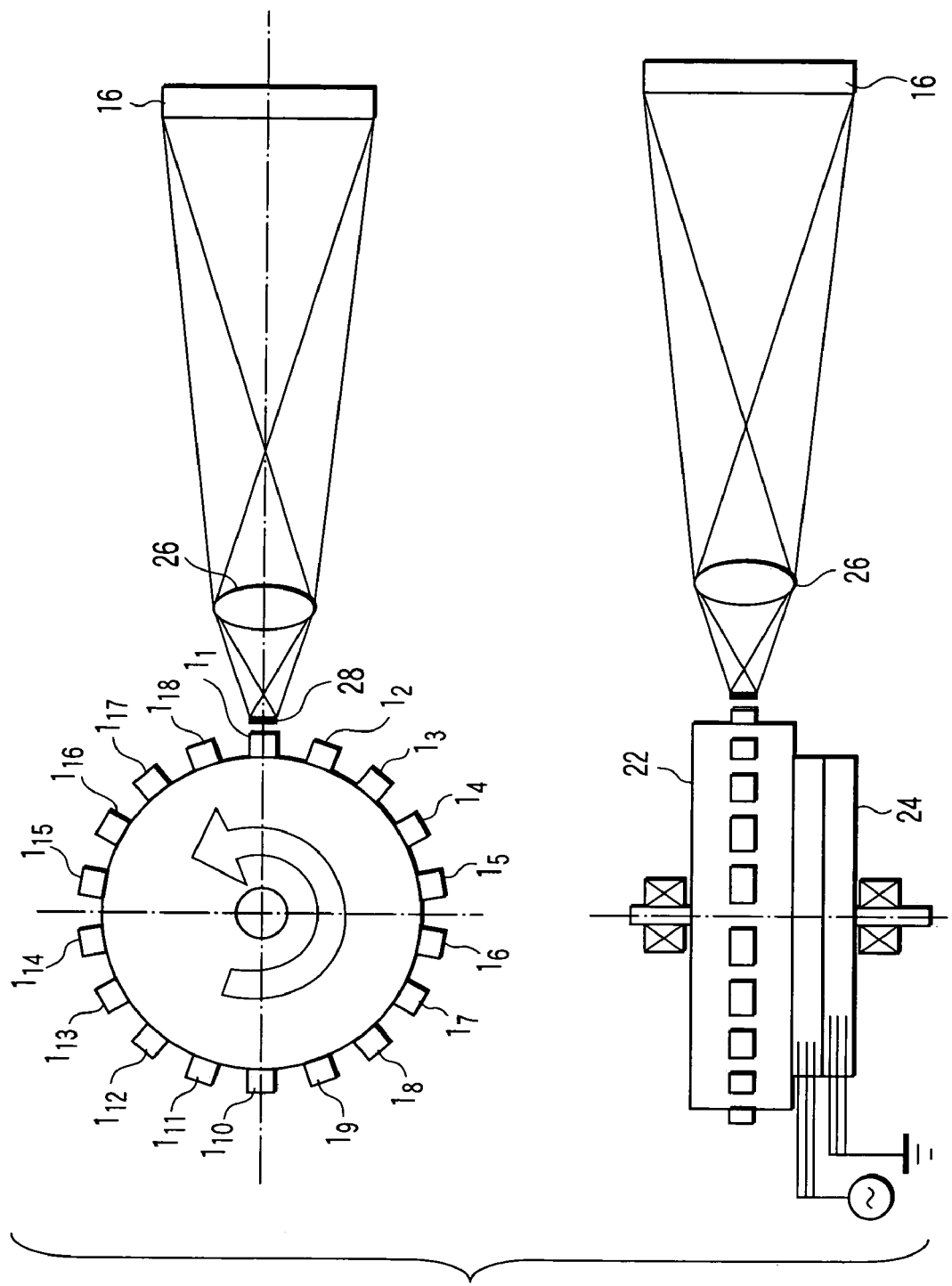
F I G. 4

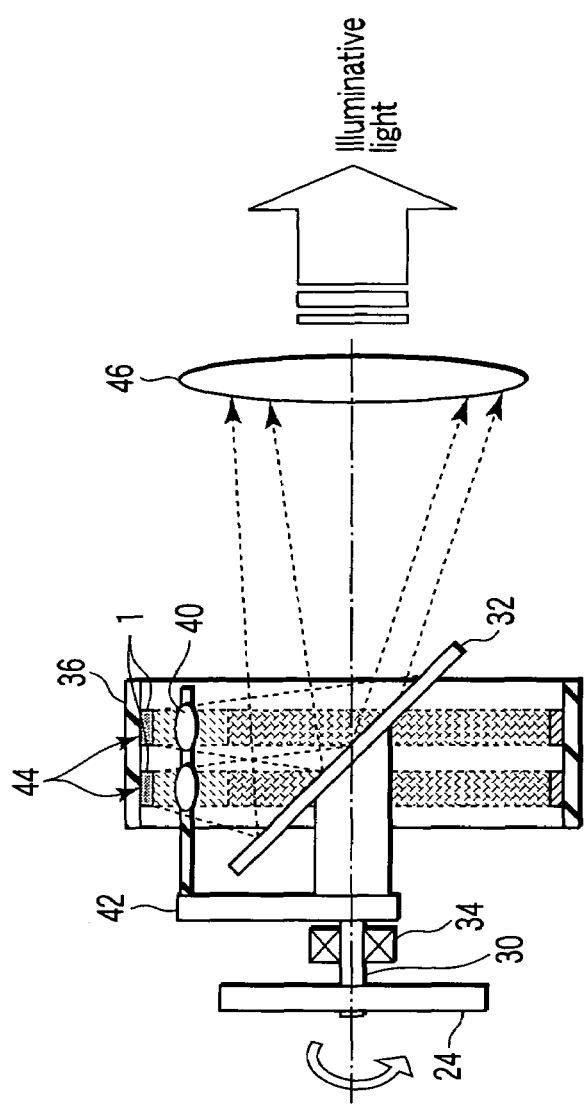
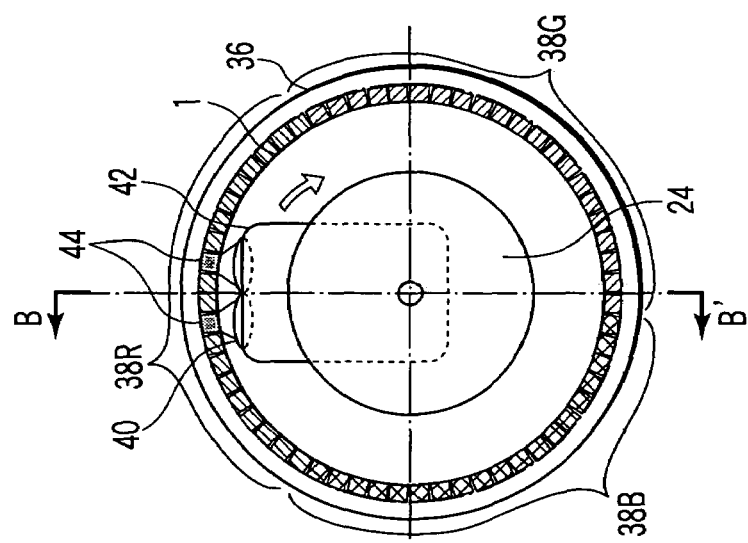
FIG. 13A
FIG. 13B

ILLUMINATION APPARATUS AND IMAGE PROJECTION APPARATUS USING THE ILLUMINATION APPARATUS

CROSS-REFERENCE TO RELATED APPLICATIONS

This application is based upon and claims the benefit of priority from prior Japanese Patent Application No. 2003-418263, filed Dec. 16, 2003, the entire contents of which are incorporated herein by reference.

BACKGROUND OF THE INVENTION

1. Field of the Invention

The present invention relates to an illumination apparatus which illuminates a portion to be illuminated with light from light emitting members such as a light-emitting diode (LED), and an image projection apparatus in which the illumination apparatus is used.

2. Description of the Related Art

Examples of a condenser illumination apparatus which illuminates a specified portion with high efficiency have heretofore been known such as a car headlight, stand illumination, spot light, flashlight, and illumination unit for a data projector. In this condenser illumination apparatus, light from a light emitting source closer to a point source is reflected by a reflection unit whose reflection shape is devised, directivity of a light flux of the reflected light is enhanced by an optical lens, and the reflected light is usually used to effectively perform condenser illumination.

In the same manner as in conventional illumination, even in these condenser illumination apparatus, there is much demand for obtaining a brighter illumination light without excessively enlarging a size of the apparatus. In order to obtain the brighter illumination light, the size of the condenser illumination apparatus tends to increase. Particularly to enlarge an applied power of the light emitting source, thereby to increase q quantity of output light, and additionally to enhance a condenser capability, the reflection unit or optical lens is applied which is relatively enlarged with respect to the light emitting source. Therefore, to obtain brightness with good condenser efficiency, the size of the illumination apparatus has to be necessarily enlarged with respect to the light emitting source. In other words, with a small-sized light emitting source which has a high output and which is close to the point source, it is also possible to miniaturize the whole illumination apparatus. From this demand, the miniaturization of the light emitting source of a conventional system has also been advanced, and particularly a small-sized light emitting source by a discharge type from which the high output is possible has been effective means at present. Additionally, even with the light emitting source of the small-sized discharge type, the driving by a high-voltage power source is required in which it is difficult to reduce a circuit scale. There are other many problems with respect to the miniaturization of the total illumination apparatus. It is said that the miniaturization has already substantially approached limitation.

On the other hand, LED is remarkably noted as a next-generation small-sized light emitting source nowadays. The LED has heretofore had advantages such as small size, high durability, and long life, but has been mainly used as indicator illumination for various instruments or a confirmation lamp of a control stage because of restrictions of emission efficiency and emission output. However, in recent years, the emission efficiency has been rapidly improved, and it is said to be a matter of time before the emission efficiency exceeds that of a high-pressure mercury lamp or fluorescent lamp of the discharge type assumed to have heretofore had highest efficiency. By appearance of the high-efficiency high-brightness LED, the high-output light emitting source by the LED has rapidly been brought into a practical use. In recent years, in addition to red and green, a blue LED has entered a practical-use stage, and this also accelerates the application of the light emitting source. In actual, a plurality of high-efficiency high-brightness LED are used to start the practical use in traffic lights, large-sized full-color displays for outdoors, various car lamps, and backlights of liquid crystal displays in the cellular phones, which has heretofore been impossible in brightness or efficiency.

It is thought that this high-efficiency high-brightness LED is also applied as a promising small-sized light emitting source of the illumination apparatus requiring a condensing property. The LED is originally superior to the other light emitting sources in life, durability, lighting-on speed, and simplicity of a lighting-on/driving circuit. Above all, the blue color is added, three primary colors are obtained as spontaneous-light emitting sources, and an application range of a full-color image display apparatus has therefore been enlarged. Typical examples of the illumination apparatus whose condensing property is demanded include a projector display apparatus (image projection apparatus) in which a display image is formed and projected from image data. The image projection apparatus has heretofore separated desired primary colors from a white-based light emitting source by color filters, and has subjected the image data corresponding to each color to spatial light modulation. When the light obtained by the spatial light modulation is spatially or temporally synthesized, color image display is possible. When the white-based light emitting source is used, only the desired color is separated and used. Therefore, the colors other than the separated color are uselessly discarded by the filter in many cases. In this respect, since the LED emits the light of the desired color itself, a necessary quantity of light can be emitted when necessary. As compared with the conventional white-based light emitting source, the light is not wasted, and the light of the light emitting source can be used with good efficiency.

This superior application condition of the LED has been noticed. For example, Jpn. Pat. Appln. KOKAI Publication No. 11-32278, U.S. Pat. No. 6,227,669B1, U.S. Pat. No. 6,318,863, and the like disclose an example in which the LED is applied to the illumination apparatus for the image projection apparatus. The technique disclosed in these publications comprises: disposing a plurality of LEDs to secure a quantity of light; condensing some of fluxes from the individual light emitting sources by optical elements such as the optical lens; and controlling the fluxes so that an image display element as a modulation device to be irradiated is well defined at an allowed incidence angle. For the image display elements such as a liquid crystal device broadly used in general, since the allowed incidence angle is small, it is supposedly ideal to form the flux having higher parallelism and to irradiate the elements. This is a very important point in enhancing light use efficiency in the image display element.

Moreover, as the characteristic of the LED, it is generally known that heat is generated with the emission of the LED and that the emission output of the LED drops in inverse proportion to the increase of the generated heat. To solve the problem, in Jpn. Pat. Appln. KOKAI Publication No. 6-13652, it is disclosed that the current is controlled in order to prevent the heat generation, and driving (pulse driving) is performed in order to obtain a non-emission time. Accordingly, the quantity of emitted light is maintained.

BRIEF SUMMARY OF THE INVENTION

According to a first aspect of the present invention, there is provided an illumination apparatus which applies light from light sources to a region to be illuminated, comprising:

a plurality of light emitting members which are the light sources;

a emitted light quantity control unit configured to control emitted light quantities of the plurality of light emitting members; and a light transmissibility changing unit configured to be capable of controlling transmissibility of each light path which transmits output light of the light emitting member to the region to be illuminated, wherein the emitted light quantity control unit controls the emitted light quantity and the light transmissibility changing unit controls the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T.

According to a second aspect of the present invention, there is provided an image projection apparatus comprising:

an illumination apparatus which applies light from light sources to a region to be illuminated, including:

a plurality of light emitting members which are the light sources;

a emitted light quantity control unit configured to control emitted light quantities of the plurality of light emitting members; and a light transmissibility changing unit configured to be capable of controlling transmissibility of each light path which transmits output light of the light emitting member to the region to be illuminated, the emitted light quantity control unit controlling the emitted light quantity and the light transmissibility changing unit controlling the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;

an image display element disposed in the region to be illuminated; and an optical projection system configured to enlarge and project an image on the image display element.

According to a third aspect of the present invention, there is provided an illumination apparatus which applies light from light sources to a region to be illuminated, comprising:

a plurality of light emitting members which are the light sources;

emitted light quantity control means for controlling emitted light quantities of the plurality of light emitting members; and light transmissibility changing means for being capable of controlling transmissibility of each light path which transmits output light of the light emitting member to the region to be illuminated, wherein the emitted light quantity control means controls the emitted light quantity and the light transmissibility changing means controls the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T.

According to a fourth aspect of the present invention, there is provided an image projection apparatus comprising:

an illumination apparatus which applies light from light sources to a region to be illuminated, including:

a plurality of light emitting members which are the light sources;

emitted light quantity control means for controlling emitted light quantities of the plurality of light emitting members; and light transmissibility changing means for being capable of controlling transmissibility of each light path which transmits output light of the light emitting member to the region to be illuminated, the emitted light quantity control means controlling the emitted light quantity and the light transmissibility changing means controlling the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;

an image display element disposed in the region to be illuminated; and an optical projection system configured to enlarge and project an image on the image display element.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing a functional configuration model of an illumination apparatus according to a first embodiment of the present invention;

FIG. 4 is a diagram showing a concrete configuration example including a plurality of light emitting members and a light transmissibility changing unit in the illumination apparatus according to the first embodiment;

FIG. 13A is a back view showing a further example of a concrete configuration including a plurality of light emitting members and a light transmissibility changing unit in the illumination apparatus according to the first embodiment;

FIG. 13B is a sectional view along a BB' arrow line of FIG. 13A;

DETAILED DESCRIPTION OF THE INVENTION

Definitions of terms for use in the present specification will be first described prior to detailed description of embodiments of the present invention with reference to the drawings.

That is, the term "region to be illuminated" is a region to be illuminated, such as an image display element in an illumination apparatus in an image projector. Moreover, a "light source" is a light source whose quantity of light is changeable and controllable, and mainly refers to a semiconductor light source such as an LED. A "predetermined time T" refers to a so-called frame time such as a change period of an image in the image projector, and is a time of a period which is not easily visually recognized when the quantity of light is periodically varied in the illumination apparatus.

On the other hand, the "quantity of light" indicates a quantity of light integrated per predetermined period T. The quantity of light is used as a "quantity of emitted light" on the side of the light source, and as a "quantity of illuminative light" on the side of light emission of the region to be illuminated. Additionally, it is assumed that the "quantity of the illuminative light" indicates a usable quantity of light, there is a limitation of incidence NA as to incident light, for example, in an LCD, and the quantity indicates a quantity of light in the limited range. Moreover, "brightness" indicates momentary intensity of light emitted from the light source, and is used separately from the "quantity of light".

Next, to aid in understanding the present invention, a case where bright illumination is not obtained even when the number of LEDs illuminating the region to be illuminated will be described.

In the illumination of the region to be illuminated by a plurality of LEDs, conditions under which the quantity of the illuminative light becomes maximum are that the plurality of LEDs are fixed to positions optimum for transmitting the light emitted from the LEDs to the region to be illuminated, and are stationarily lit to supply the rated current. However, when the LED light source is used in an image projector or the like, a quantity of light of about 500 ANSI lumens required for the image projector cannot be obtained, even when a large number of LEDs available at the time of the development of the present invention are arranged. This is due to the reasons described below, in addition to a reason that the quantity of the emitted light of the LED cannot be obtained.

Figure 1A:
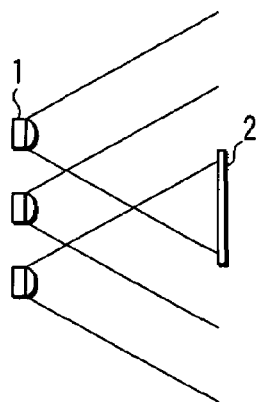
FIG. 1A is a diagram showing a conventional configuration of an optical illumination system in a case where relative positions of an LED and optical means are fixed.
Figure 1B:
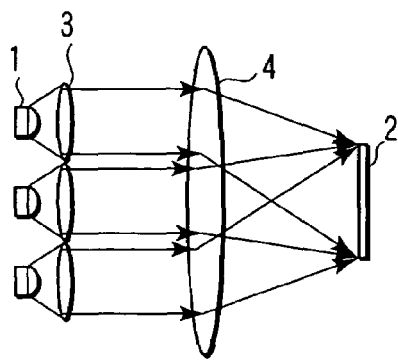
FIG. 1B is a diagram showing another conventional configuration of the optical illumination system in a case where the relative positions of the LED and optical means are fixed.
Figure 1C:
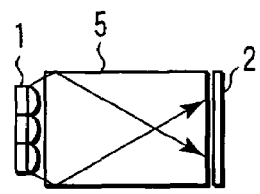
FIG. 1C is a diagram showing a further conventional configuration of the optical illumination system in a case where the relative positions of the LED and optical means are fixed.

First, in a case where the relative positions of the LEDs, which are the light source, and the optical means are fixed, configurations shown in FIGS. 1A to 1C are considered as an optical illumination system which illuminates a region to be illuminated such as a modulation device (image display element). That is, in a case where a region 2 to be illuminated is illuminated by a plurality of LEDs 1 in the configuration shown in FIG. 1A, the region 2 to be illuminated. In the configuration shown in FIG. 1B, the optical means comprises micro lenses 3 disposed immediately after the respective LEDs 1, and a superimposition lens 4 which superimposes the light of each LED 1 upon the region 2 to be illuminated. The configuration shown in FIG. 1C comprises a plurality of aligned LEDs 1, and optical means configured of a glass rod 5 which is disposed immediately after the arrangement and whose side face reflects the light by a total reflection characteristic.

In any of FIGS. 1A to 1C, the quantity of light of the region 2 to be illuminated can be represented by brightness of the light source (LEDs 1) and transmissibility of the optical means including all light paths including air and the like. That is, assuming that the brightness of the LED 1 is $L_j$, transmissibility is $K_j$, and predetermined period is T, a total quantity P of the illuminative light per predetermined period T in the region 2 to be illuminated can be represented by the following equation:

$$P = \sum_{j=1}^{n} \{L_j \times K_j\} \times T$$

Moreover, concretely, the following is a comparatively bright illumination method. That is, assuming that the brightness of the LED 1 is $L_j$-typ (brightness in the light emitting face of the LED by stationary lighting), the transmissibility is $K_j$-stop (the LEDs are fixed), and the predetermined period is T, a (total) quantity P-typ of the illuminative light per predetermined period T in the region 2 to be illuminated is represented by the following equation:

$$P - typ = \sum_{j=1}^{n} \{L_j\text{-}typ \times K_j\text{-}stop\} \times T$$

That is, assuming that a ratio at which the light emitted by one LED 1 is guided into the region 2 to be illuminated is $K_j$, the total quantity P of the illuminative light in the region 2 to be illuminated is a total of light quantities $P_j$ obtained by multiplying a light quantity $P_j$-typ emitted by each LED 1 by each transmissibility $K_j$.

However, in a case where the region 2 to be illuminated is an LCD which is an image display element, as to the light usable in the region 2 to be illuminated, all of the light guided into the region 2 to be illuminated cannot be utilized, and light which has obliquely entered the region cannot be utilized in some cases. The above-described $K_j$ has been described as a ratio of the transmission to the region 2 to be illuminated, but in this case, the light emitted by the light source has a ratio of light which can be effectively utilized in the region 2 to be illuminated. That is, this does not mean that the more LEDs 1 are arranged, the more the quantity of light effectively usable in the region 2 to be illuminated increases. Even when a predetermined number of or more LEDs are arranged, the effectively usable light cannot be obtained. Therefore, when the region 2 to be illuminated is illuminated by the predetermined number of the arranged LEDs 1, the LEDs 1 are stationarily lit at a rated current. When the LEDs 1 are fixed, the region can be illuminated most brightly.

Stationary lighting has been described above, but the LEDs can be adapted for both stationary light emission and pulse light emission. In the pulse light emission from the LEDs 1, light brighter than that during the stationary lighting can be emitted for a light emitting time of the pulse light emission. However, in continuous light emission for the predetermined period T which is not less than the period of the pulse light emission and for which the quantity of the illuminative light can be visually stably recognized, the light at the pulse light emission time cannot be set to be brighter than that at the stationary light emission time. That is, when the region 2 to be illuminated is continuously illuminated, it is difficult to set the pulse light emission to be brighter than the stationary light emission of the LED 1 with the quantity of the illuminative light of the region 2 to be illuminated for the predetermined period T. In the illumination with respect to the region to be illuminated in a case where the LEDs and the light paths are fixed, a maximum quantity of light can be obtained in the region 2 to be illuminated by control of the quantity of light of the LED not in the pulse light emission but in the stationary light emission with the supplied rated current.

On the other hand, when the light source is moved, the quantity of light in the region 2 to be illuminated can be changed. That is, the transmissibility in the transmission to the region 2 to be illuminated changes depending on the position of the light source. For example, in the configuration of FIG. 1C, when three LEDs 1 are disposed in an incidence port position of the rod 5 as shown, the region 2 to be illuminated indicates the maximum quantity of light. When the LEDs 1 are moved, for example, in an upward direction in the drawing, the incident light upon the rod 5 from the uppermost LED decreases, and therefore the quantity of light of the region 2 to be illuminated decreases.

As described above, even when the number of the light emitting diodes 1 is increased for bright illumination, LED positions suitable for effective transmission of the light from the LEDs 1 to the region 2 to be illuminated are limited, and accordingly there has been a problem that it is difficult to guide the light of the increased LEDs into the region 2 to be illuminated with raised transmissibility.

An object of the present invention is to provide an illumination apparatus which solves the above-described problem and which obtains illumination brighter than that by the quantity of light in the region 2 to be illuminated, obtained on "conditions under which the quantity of the illuminative light is maximized", that is, "the LEDs are fixed to optimum positions for transmitting the light emitted from the plurality of LEDs to the region to be illuminated and the rated current is supplied to each LED in the stationary lighting".

Embodiments of the present invention will be described hereinafter in detail with reference to the drawings.

FIRST EMBODIMENT

As shown by a functional configuration model of FIG. 2, an illumination apparatus according to a first embodiment of the present invention comprises a plurality of light emitting members (LEDs $1_1$, $1_2$, $1_3$, $1_4$, $1_5$, . . . ); an emitted light quantity control unit 10 which controls emitted light quantities of the plurality of LEDs; and a light transmissibility changing unit 12 capable of changing transmissibility of each light path which transmits the output light of the LED to a region to be illuminated. Here, the emitted light quantity control unit 10 controls the quantity of the emitted light and the light transmissibility changing unit 12 controls the transmissibility in such a manner that a quantity P of illuminative light becomes larger than a quantity P-typ of the illuminative light. The quantity P-typ of the illuminative light is the quantity of the illuminative light in the region to be illuminated in a case where a predetermined number n of LEDs which are some of the plurality of LEDs $1_1$, $1_2$, $1_3$, $1_4$, $1_5$, . . . are stationarily lit with a rated driving current I-typ in a predetermined period T. The quantity P of the illuminative light is the quantity of the illuminative light in the region to be illuminated in a case where the predetermined number of light emitting members are intermittently lit with a driving current value larger than the rated current in the predetermined period T. To satisfy the above-described conditions, the emitted light quantity control unit 10 and the light transmissibility changing unit 12 operate in synchronization with each other by a synchronous signal. It is to be noted that this synchronous signal is shown by arrows of opposite directions in the drawing, but may have one direction as long as the emitted light quantity control unit 10 and the light transmissibility changing unit 12 can be controlled to be synchronized.

Here, the emitted light quantity control unit 10 controls three factors: a light emission timing; a light emission time; and a driving current value in cooperation with the light transmissibility changing unit 12 in a case where the changing unit allows the LEDs to intermittently emit the light in accordance with the transmissibility of each light path periodically controlled by the changing unit.

Moreover, the light transmissibility changing unit 12 relatively moves, for example, with respect to the plurality of LEDs $1_1$, $1_2$, $1_3$, $1_4$, $1_5$, . . . to thereby change the transmissibility of the light path, and comprises a driving unit 14 for relative movement.

Figure 3:
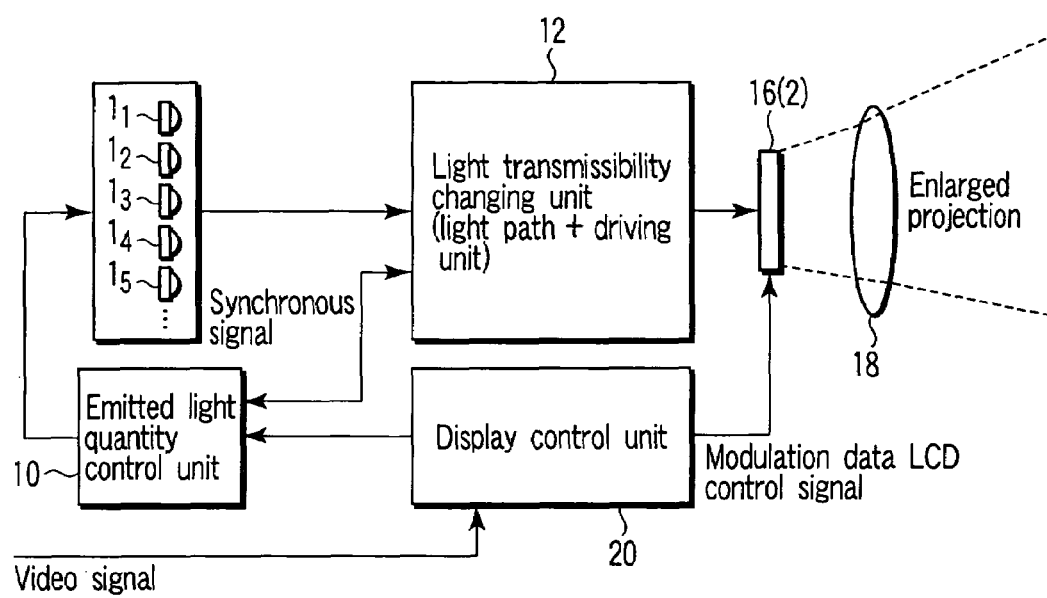
FIG. 3 is a diagram showing a functional configuration model of an image projection apparatus according to the first embodiment of the present invention using the illumination apparatus of FIG. 2.

As shown by a functional configuration model of FIG. 3, an image projection apparatus according to the first embodiment of the present invention uses the illumination apparatus having the above-described configuration comprising: the plurality of light emitting members (LEDs $1_1$, $1_2$, $1_3$, $1_4$, $1_5$, . . . ); the emitted light quantity control unit 10; and the light transmissibility changing unit 12. Furthermore, the image projection apparatus includes: an LCD 16 which is an image display element disposed in the region 2 to be illuminated of the illumination apparatus; an optical projection system 18 for enlarging, projecting and displaying an image on the LCD 16; and a display control unit 20 which controls the emitted light quantity control unit 10 and the LCD 16 in response to a video signal to be projected/displayed.

A concrete configuration of the plurality of light emitting members and the light transmissibility changing unit 12 in the above-described illumination apparatus is shown, for example, in FIG. 4. A configuration of the figure comprises: 18 red LEDs $1_1$, $1_2$, . . . , $1_{18}$ which are light emitting members; a support member 22 on which the respective LEDs are arranged in a ring shape; and a motor 24 which rotates the support member 22. Moreover, the light emitted by the annularly arranged LEDs in predetermined positions is condensed on the LCD 16 of the region 2 to be illuminated by a lens 26. It is to be noted that the light transmissibility changing unit 12 comprises: the support member 22, the motor 24, a driving unit (including rotation control of the motor) of the motor 24, and the lens 26 which is the light path and which forms an image of a condensing region 28 on the region 2 to be illuminated.

In this configuration, one LED is disposed in the "predetermined position in the annular arrangement", which is the condensing region 28 capable of condensing the light onto the region 2 to be illuminated by the lens 26 in order to illuminate the region 2 to be illuminated with maximum brightness in a case where all the 18 LEDs $1_1$, $1_2$, . . . , $1_{18}$ are stationarily lit at the rated current. That is, as shown by the following equation, the maximum quantity of light is obtained at a time when one LED fixed to the condensing region 28 is stationarily lit at the rated current:

$$P\text{-}typ = \sum_{j=1}^{18} \{L_j\text{-}typ \times K_j\text{-}stop\} \times T$$

$$= \{L_1\text{-}typ \times K_1\text{-}stop\} \times T$$

where $K_1$-stop indicates the transmissibility in condensing the light emitted from the LED onto the region 2 to be illuminated via the lens 26.

Figure 5:
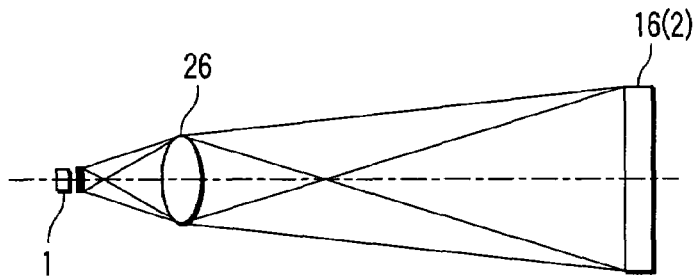
FIG. 5 is a diagram showing an equivalent optical configuration at a time when one LED fixed in a condensing region is stationarily lit with a rated current.
Figure 6:
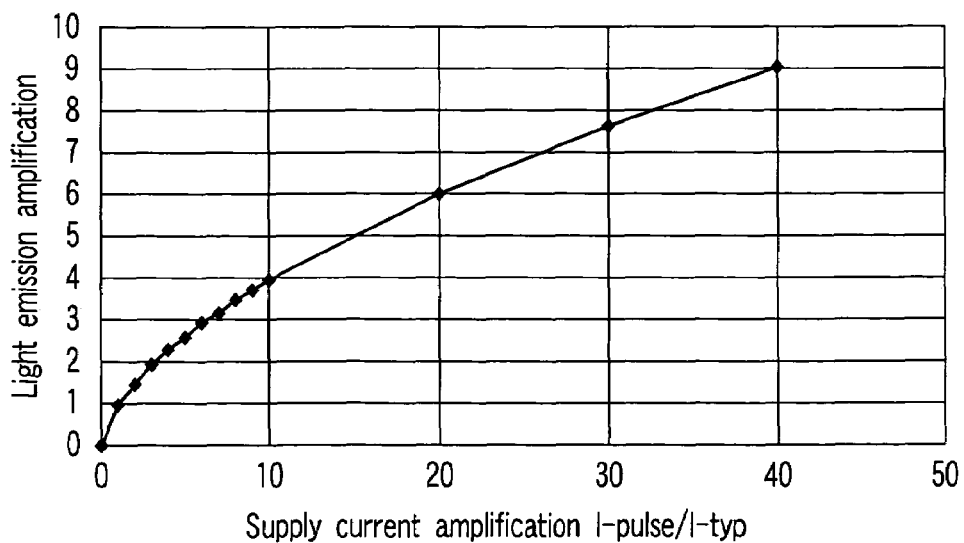
FIG. 6 is a diagram showing a graph showing a relation between a duty ratio and a light emitting amplification with respect to brightness L-typ during light emission at a rated current I-typ at the time of stationary light emission.

That is, this is the same as a case where the LED 1 stationarily emits the light at the rated current in a configuration shown in FIG. 5. At this time, as to brightness with respect to the current to be supplied to the LED, a large brightness L-pulse is obtained with respect to brightness L-typ at a time when the LED emits the light at the rated current I-typ in the stationary light emission. A relation is shown in FIG. 6. In this graph, a duty ratio is shown on the abscissa, light emission amplification with respect to L-typ is shown on the ordinate, and the following is graphed:

light emission amplification×L-typ=(I-pulse/I-typ)0.6

(where (I-pulse/I-typ)<40 or limited to 40)

A supply current amplification I-pulse/I-typ is set to an upper limit of I-pulse by a duty indicating a ratio of the light emission time of pulse light emission of each LED to a period. This upper limit differs with characteristics of the individual LEDs. Here, an inverse number of a duty Tp/T is set to Tp/T=I-pulse/I-typ, and the upper limit of I-pulse is defined. Moreover, 40 times or more characteristics are not indicated by I-pulse/I-typ, and this is because more current cannot be supplied so that the LED should not break down. Then, when the inverse number T/Tp of the duty Tp/T is 40 times or more, I-pulse is set using I-pulse/I-typ=40.

Figure 7:
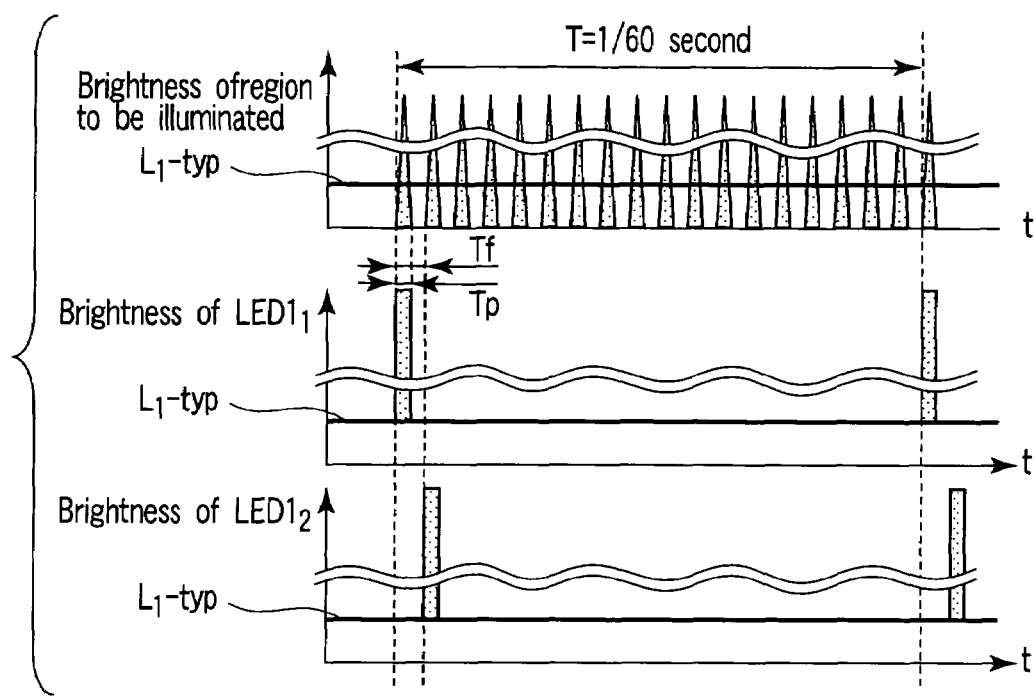
FIG. 7 is a timing chart in a case where the number of LEDs is 18, an LED chip size is 1 mm×1 mm, a ring radius is 50 mm, a rotation speed is 360 rpm, a condensing region is 1 mm×1 mm, and it is assumed that the LEDs emit light for 1 mm before/after the condensing region.

An illumination method for obtaining the quantity of the illuminative light brighter than the quantity P-typ of the illuminative light will be described hereinafter in a configuration shown in FIG. 4. Assume that a chip size of the LED is 1 mm×1 mm and a radius r of the ring is r=50 mm, circumference is 314 mm from 2×π×r, and a pitch between the LEDs is 17.4 mm. Assuming that a rotation speed is 360 rpm (=60 rps), a cycle $T_f$ for which a certain LED reaches the condensing region 28 is 0.93 mS (=1/(60×18)). Here, assuming that the condensing region 28 is 1 mm×1 mm, and the LED emits the light for 1 mm before/after the condensing region 28, the respective LEDs $1_1$, $1_2$, . . . , $1_{18}$ emit the light at light emission timings shown in FIG. 7. That is, the light emission of each LED is pulse light emission in which a light emission ratio $T_p/T_f$ of the light illuminating the region 2 to be illuminated is 2/17.4. The light emission amplification in this case is nine times from a relation shown in FIG. 6, when a duty of the pulse light emission of each LED is 2/314. Therefore, in this case, the following equation results, and the illumination becomes darker than the quantity P-typ of the illuminative light:

$$P = \int_0^T \sum_{j=1}^n \{L_j(t) \times K_j(t)\} dt$$

$$= 9 \times L\text{-}typ \times 2/17.4 \times k_1\text{-}stop/2$$

$$= 0.52 \times L\text{-}typ \times k_1\text{-stop}$$

$$= 0.52 \times P\text{-}typ$$

Where "9×L-typ" indicates the light emission amplification, "2/17.4" indicates the light emission ratio $T_p/T_f$, and "$k_1$-stop/2" indicates the average value of transmissibility accompanying movement.

Figure 8:
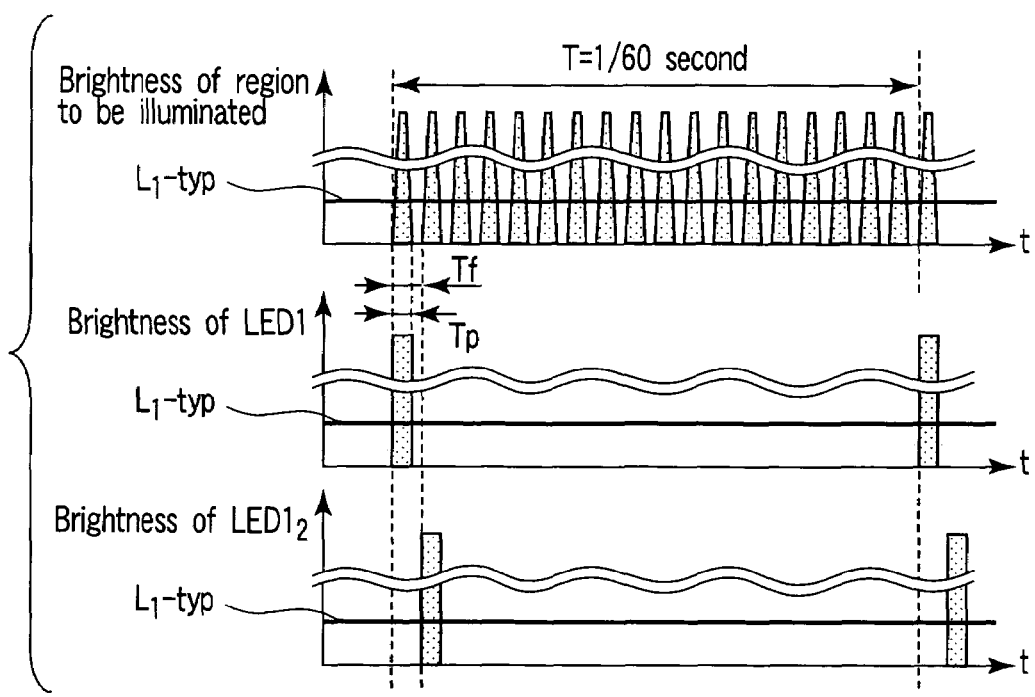
FIG. 8 is a timing chart in a case where the number of the LEDs is 18, the LED chip size is 1 mm×1 mm, the ring radius is 10 mm, the rotation speed is 360 rpm, the condensing region is 1 mm×1 mm, and it is assumed that the LEDs emit the light for 1 mm before/after the condensing region.

Then, the chip size of the LED is set to 1 mm×1 mm, and the radius of the ring is configured to be r=10 mm. In this case, the circumference is 62.8 mm from 2×π×r, and the pitch between the LEDs is 3.5 mm. It is to be noted that the rotation speed is set to 360 rpm, a cycle $T_f$ for which the LED reaches the condensing region 28 remains to be 0.93 mS, the condensing region 28 is 1 mm×1 mm, and the LED emits the light for 1 mm before/after the condensing region 28. In this case, the light emission is performed at timings shown in FIG. 8, and the light emission of each LED is pulse light emission having a light emission ratio $T_p/T_f$ of 2/3.5. The light emission amplification in this case is 7.91 times from a relation shown in FIG. 6, when the duty of the pulse light emission of each LED is 2/62.8. Therefore, the brightness in the region 2 to be illuminated results in the following equation, and the illumination can be set to be brighter than the quantity P-typ of the illuminative light:

$$P = \int_0^T \sum_{j=1}^n \{L_j(t) \times K_j(t)\} dt$$

$$= 7.91 \times L\text{-}typ \times 2/3.49 \times k_1\text{-stop}$$

$$= 2.27 \times L\text{-}typ \times k_1\text{-stop}$$

$$= 2.27 \times P\text{-}typ$$

Where "7.91×L-typ" indicates the light emission amplification, "2/3.49" indicates the light emission ratio $T_p/T_f$, and "$k_1$-stop" indicates the average value of transmissibility accompanying movement.

When the support member 22 supporting the LEDs $1_1$, $1_2$, ..., $1_{18}$ is set to be small, and an LED interval is narrowed, the illumination can be performed brightly. That is, the LED performs the pulse light emission with a current larger than the rated current I-typ, and the LED performing the pulse light emission is successively moved to change the transmissibility in transmitting the light of each LED to the region 2 to be illuminated. Moreover, the LED to emit the light is switched. Furthermore, a time to switch the LED is set to be shorter than a predetermined time, and accordingly the illumination can be performed brighter than P-typ.

Moreover, when the condensing region 28 is 2 mm×2 mm, the following results. Here, assuming that the LED emits the light for 1 mm before/after the condensing region 28, the pulse light emission is performed with a light emission ratio $T_p/T_f$ of 3/3.5. Since the duty of the pulse light emission of each LED is 3/62.8, the light emission amplification in this case is 7.91 times from the relation of FIG. 6. Therefore, the brightness in the region 2 to be illuminated is represented by the following equation, and can be brighter than the above-described quantity P-typ of the illuminative light:

$$P = \int_0^T \sum_{j=1}^n \{L_j(t) \times K_j(t)\} dt$$

$$= 6.20 \times L\text{-}typ \times 3/3.49 \times k_1\text{-stop}$$

$$= 4.0 \times L\text{-}typ \times k_1\text{-stop}$$

$$= 4.0 \times P\text{-}typ$$

Where "6.20×L-typ" indicates the light emission amplification, "3/3.49" indicates the light emission ratio $T_p/T_f$, and "0.75×k1-stop" indicates the average value of transmissibility accompanying movement.

When the condensing region 28 has a larger area with a transmissibility closer to K-stop, the brightness can be set to be higher than P-typ. Additionally, in a case where the region 2 to be illuminated has a predetermined area, and an allowable angle of the incident light has a predetermined angle, even when the area of the condensing region 28 is set to be larger than a predetermined area, the brightness does not increase in consideration of etendue. That is, the predetermined number of the LEDs are fixed to the condensing region 28 having an area larger than the LED chip area, and LEDs are allowed to perform the pulse light emission with a current larger than the rated current I-typ with respect to the light quantity P-typ in the region 2 to be illuminated for a predetermined period during the stationary lighting at the rated current. The pulse-light-emitting LEDs are successively moved, the transmissibility in transmitting the light of each LED to the region 2 to be illuminated is changed, and further the LED to emit the light is switched. The longer the time for which the transmissibility is high during the changing of the transmissibility is, the brighter the illumination can be performed.

Figure 10:
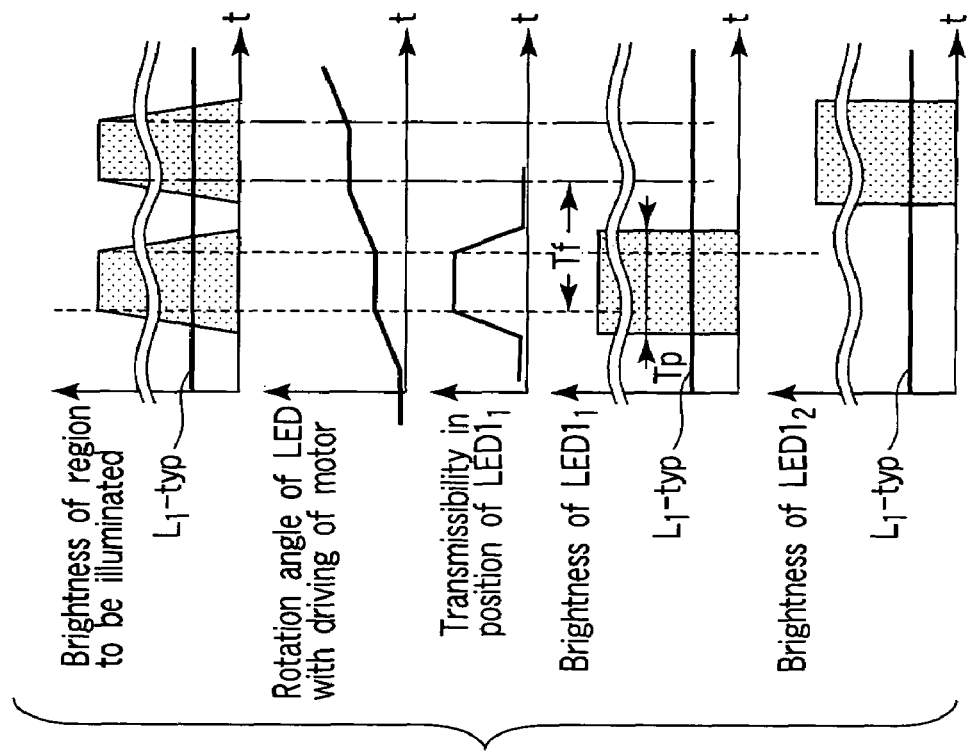
FIG. 10 is a timing chart in a case where a stepping motor is used on conditions similar to those of FIG. 8.
Figure 9:
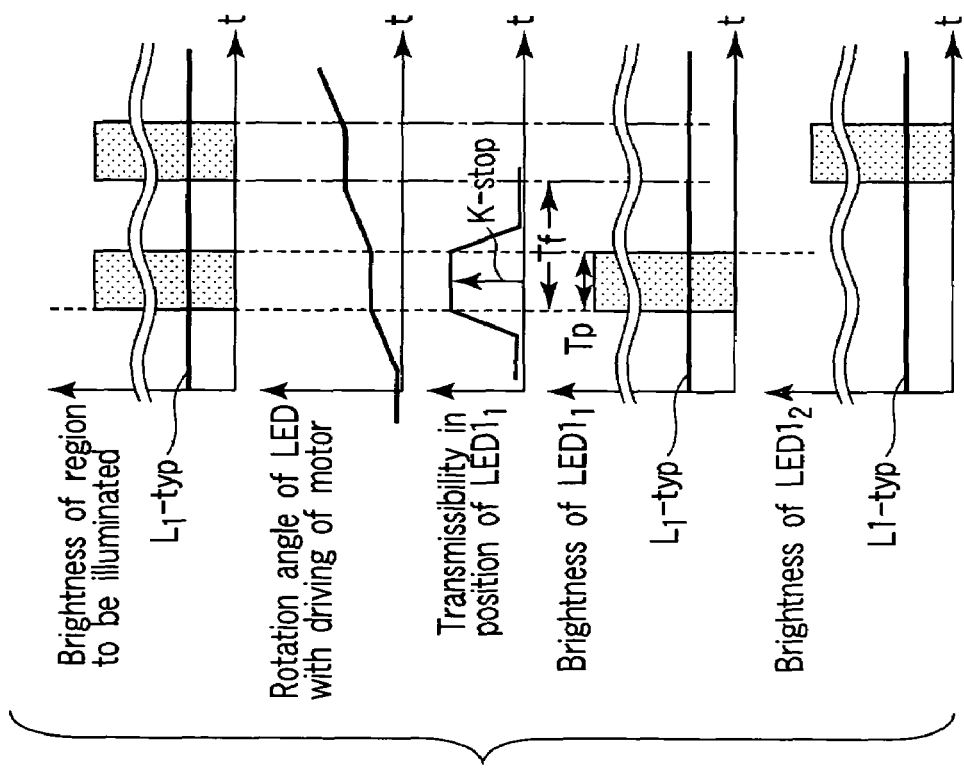
FIG. 9 is a timing chart in a case where a stepping motor is used on conditions similar to those of FIG. 7.

Furthermore, when a stepping motor is used as the motor 24 of FIG. 4, and the support member 22 is assumed to be rotatable at a high speed in a stepwise manner, as shown in FIG. 9 or 10, a time can be lengthened in a position where the transmissibility of each LED is high, and therefore the light can be brightened.

Moreover, when the number of the LEDs supported by the support member 22 is three, the following results. That is, in this case, one LED is disposed in the above-described "predetermined position of the annular arrangement" which is the condensing region 28 capable of condensing the light onto the region 2 to be illuminated by the lens 26 in order to maximize the brightness of the region 2 to be illuminated in the stationary lighting of three LEDs. That is, as represented by the following equation, a maximum quantity of light is obtained during the stationary lighting of one LED fixed to the condensing region 28 at the rated current:

$$P\text{-}typ = \sum_{j=1}^3 \{L_j\text{-}typ \times K_j\text{-stop}\} \times T$$

$$= \{L_1\text{-}typ \times K_1\text{-stop}\} \times T$$

where $K_1$-stop indicates a ratio at which the light emitted from the LED is condensed onto the region 2 to be illuminated via the lens 26. That is, this is the same as the stationary light emission of the LED at the rated current in the configuration of FIG. 5.

Figure 11:
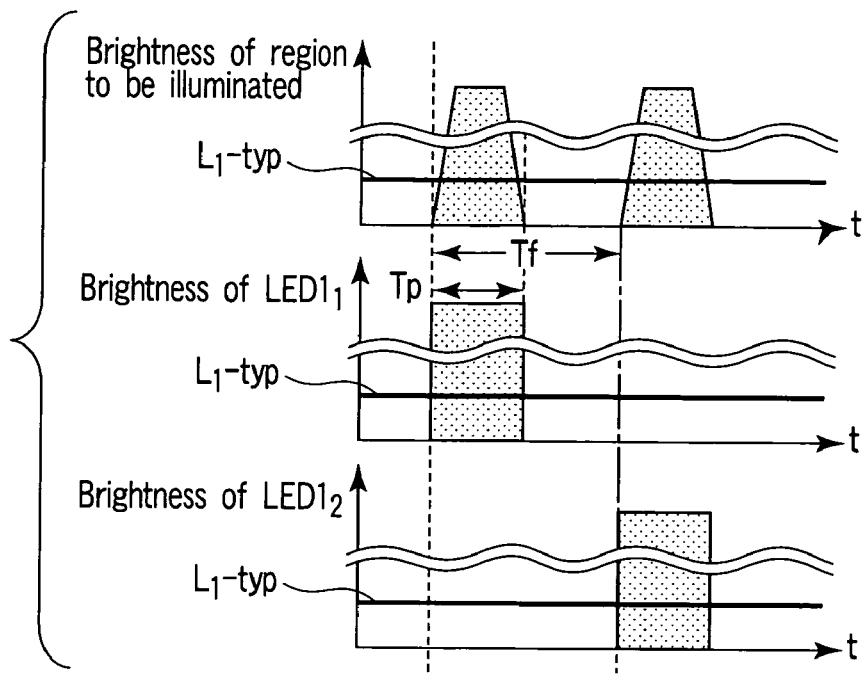
FIG. 11 is a timing chart in a case where the number of the LEDs is three, the LED chip size is 1 mm×1 mm, the ring radius is 4 mm, the rotation speed is 360 rpm, the condensing region is 2 mm×2 mm, and it is assumed that the LEDs emit the light for 1 mm before/after the condensing region.

An illumination method for obtaining the illuminative light quantity brighter than P-typ in the arrangement of three LEDs will be described hereinafter. That is, assuming that the chip size of the LED is 1 mm×1 mm and the radius of the ring is r=4 mm, circumference is 25.12 mm from 2×π×r, and the pitch between the LEDs is 8.37 mm. Assuming that the rotation speed is 360 rpm, a cycle $T_f$ for which the LED reaches the condensing region 28 is 5.56 mS. Here, assuming that the condensing region 28 is 2 mm×2 mm, and the LED emits the light for 1 mm before/after the condensing region 28, the respective LEDs $1_1$, $1_2$, $1_3$ emit the light at light emission timings shown in FIG. 11. That is, the light emission of each LED is pulse light emission in which a light emission ratio $T_p/T_f$ of the light illuminating the region 2 to be illuminated is 3/8.37. The light emission amplification in this case is 3.58 times from the relation of FIG. 6, because the duty of the pulse light emission of each LED is 3/25.12. Therefore, the brightness in the region 2 to be illuminated is represented by the following equation, and becomes lower than P-typ:

$$P = \int_0^T \sum_{j=1}^n \{L_j(t) \times K_j(t)\} dt$$

$$= 3.58 \times L\text{-}typ \times 3/8.37 \times k_1\text{-stop} \times (3/4)$$

$$= 0.96 \times L\text{-}typ \times k_1\text{-stop}$$

$$= 0.96 \times P\text{-}typ$$

Where "3.58×L-typ" indicates the light emission amplification, "3/8.37" indicates the light emission ratio $T_p/T_f$, and "k1-stop×(3/4)" indicates the average value of transmissibility accompanying movement.

Figure 12:
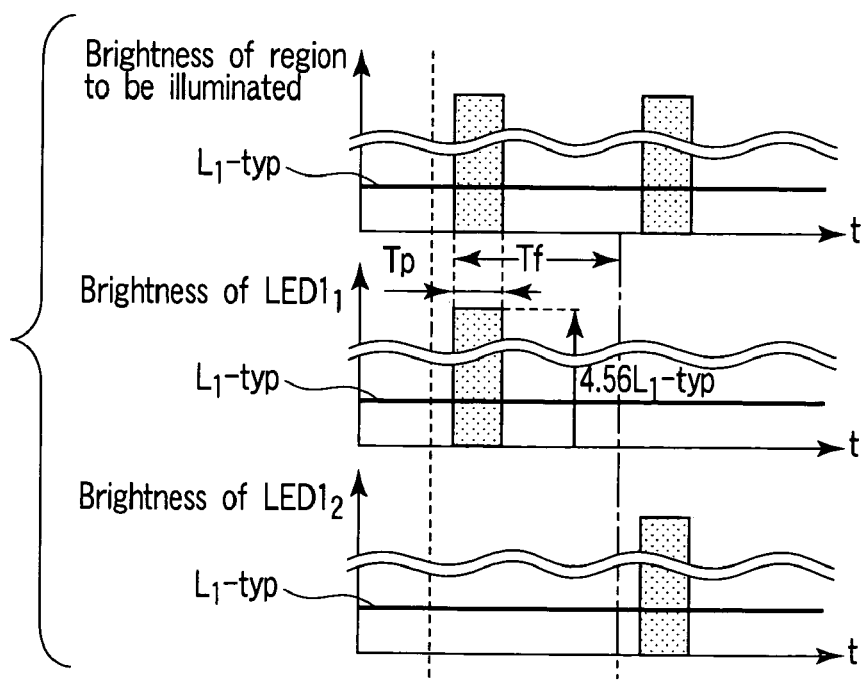
FIG. 12 is a timing chart in a case where the number of the LEDs is three, the LED chip size is 1 mm×1 mm, the ring radius is 4 mm, the rotation speed is 360 rpm, the condensing region is 2 mm×2 mm, and it is assumed that the LEDs emit the light for 2 mm before/after the condensing region.

Then, the light emission time is decreased in such a manner that each LED emits the light only in 2 mm×2 mm condensing region 28. In this case, the light is emitted at timings as shown in FIG. 12, and the light emission of each LED is pulse light emission in which the light emission ratio of the light illuminating the region 2 to be illuminated is 2/8.37. The light emission amplification in this case is 4.56 times from the relation of FIG. 6, because the duty of the pulse light emission of each LED is 2/25.12. Therefore, the brightness in the region 2 to be illuminated is represented by the following equation, and can be set to be higher than P-typ:

$$P = \int_0^T \sum_{j=1}^n \{L_j(t) \times K_j(t)\} dt$$

$$= 4.56 \times L\text{-}typ \times 2/8.37 \times k_1\text{-stop} \times 1.0$$

$$= 1.09 \times L\text{-}typ \times k_1\text{-stop}$$

$$= 1.09 \times P\text{-}typ$$

Where "4.56×L-typ" indicates the light emission amplification, "2/8.37" indicates the light emission ratio $T_p/T_f$, and "k1-stop×1.0" indicates the average value of transmissibility accompanying movement.

This indicates that the pulse light emission is performed only in the LED position containing all the LED chips in the condensing region 28 to thereby emit the light only in a position (time) having a high transmissibility with a good efficiency, the duty (light emission/cycle) of the pulse light emission of each LED is reduced (non-light emission time is lengthened) to thereby raise the light emission amplification, and accordingly the illumination brighter than P-typ can be obtained.

It is to be noted that the light transmissibility changing unit 12 is not limited to a configuration which rotates/moves a plurality of LEDs as shown in FIG. 4. As shown in FIGS. 13A and 13B, the pulse light emission is successively performed while the LEDs remain to be fixed, the mirror which is the light transmissibility changing unit rotates in response to the lighting, and the region 2 to be illuminated may be illuminated.

That is, in the illumination apparatus shown in these figures, a rotation shaft 30 is connected to a mirror 32, so that the rotation shaft 30 is integrated with the mirror 32. The rotation shaft 30 is supported by a rotation bearing 34, and connected to the motor 24. The above-described mirror 32 is rotatable in a direction shown by an arrow at a high speed by the motor 24 in this mechanism.

On the other hand, a drum supporting member 36 having a drum shape is fixed and formed using the rotation shaft 30 as a common central shaft as shown, and LEDs 1, which are light emitting members, are densely arranged along the inner side surface of the drum supporting member 36 in two stages. It is to be noted that in FIG. 13A, differences of light emission colors of the respective LEDs 1 are shown by different hatching (i.e., hatched and shown portions do not represent cross-sections). In FIG. 13B, for the sake of simplicity, instead of drawing the respective LEDs 1, LED arrays 38R, 38G, 38B are shown in which the same color is continuously arranged, the circumference is divided for each set color (shown by different broken-line hatching), and the colors of the emitted light are switched in order of red (R), green (G), and blue (B) colors in the process of one rotation.

Moreover, two sets of condensing lenses 40 are supported by a rotation supporting member 42 disposed integrally with the rotation shaft 30 in such a manner that the lenses are rotatable and movable in conjunction with the mirror 32. It is to be noted that the number of the stages in which the LEDs 1 are arranged, and the number of the sets of the condensing lenses 40 are basically equal, but the numbers are not limited to these numbers, and appropriate numbers may be set as required.

In this configuration, illuminative light capable of producing a field image having three primary colors necessary for one frame of a color image can be obtained with respect to one rotation of the mirror 32. That is, the LEDs 1 disposed in the drum supporting member 36 successively repeat the light emission in a time series, and chain light emission is performed around an inner peripheral side surface (light emission points 44 turn around). In this case, the emitted light quantity control unit 10 controls the light emission in such a manner that the mirror 32 rotates and operates, and the corresponding LED 1 emits the light in synchronization with the rotation and operation. That is, a configuration relation is established in which the light emitted from the LED 1 is reflected, condensed, and projected to the region 2 to be illuminated via an optical lens 46. That is, the light emission control is executed in such a manner that when the mirror 32 rotates and operates, the corresponding LED 1 synchronously emits the light. Moreover, the condensing lenses 40 are arranged in an arrangement relation capable of satisfactorily taking in the light emitted from the LED 1. That is, such a configuration relation is established that the light emitted from the LED 1 is once condensed by the condensing lenses 40, reflected by the mirror 32 in such a manner as to change its light path, and projected to the region 2 to be illuminated via the optical lens 46.

As described above, the light transmissibility changing unit 12 may rotate light guiding members including the mirror 32, rod and the like to change the transmissibility without rotating the LED. That is, the LED and the light guiding members are relatively moved, and the transmissibility may be changed.

SECOND EMBODIMENT

Next, a second embodiment of the present invention will be described. In the first embodiment, the LED to transmit the light is switched by mechanical driving in the light transmissibility changing unit 12, whereas, in the second embodiment, the switching is electrically performed. That is, the light transmissibility changing unit 12 is not limited to the moving of the light source or the light guiding member by the mechanical driving of the motor 24 or the like. The light transmissibility changing unit 12 may comprise electric driving of a liquid crystal or the like, optical synthesis means such as a polarized beam splitter (PBS), X prism and the like, and will be described hereinafter. That is, with regard to the light transmissibility changing unit 12 in this second embodiment, an example which does not include any mechanical rotating mechanism such as a motor will be described. This is because the light transmissibility changing unit 12 may comprise a device capable of switching reflection and transmission of a liquid crystal or the like. The control method is not limited to the electrically driven liquid crystal. A device capable of optically controlling the transmission and reflection, such as a photo writing type modulation device, may be used.

Figure 14:
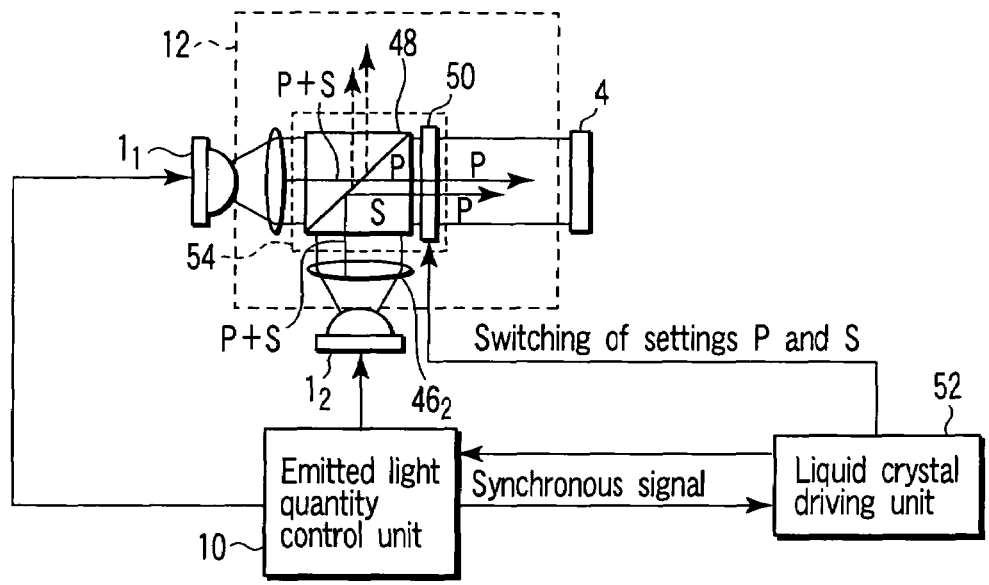
FIG. 14 is a diagram showing a configuration of the illumination apparatus according to a second embodiment of the present invention.

As shown in FIG. 14, an illumination apparatus according to the second embodiment of the present invention comprises: two LEDs $1_1$, $1_2$; optical lenses $46_1$, $46_2$ which condense light of two LEDs $1_1$, $1_2$; a PBS 48 which receives the light via two different inlets and which guides polarized light having different directions from the respective inlets toward the region 2 to be illuminated; a liquid crystal 50 which selects and transmits the polarized light projected from the PBS 48 and having different directions by electric control; and a liquid crystal driving unit 52 which controls the liquid crystal 50. Here, it is assumed that the liquid crystal 50 includes a polarizing plate which transmits only one polarized light. The PBS 48 and the liquid crystal 50 function as a light transmission switching unit 54, and the light transmissibility changing unit 12 comprises the light transmission switching unit 54, and an optical system including the optical lenses $46_1$, $46_2$.

Figure 15:
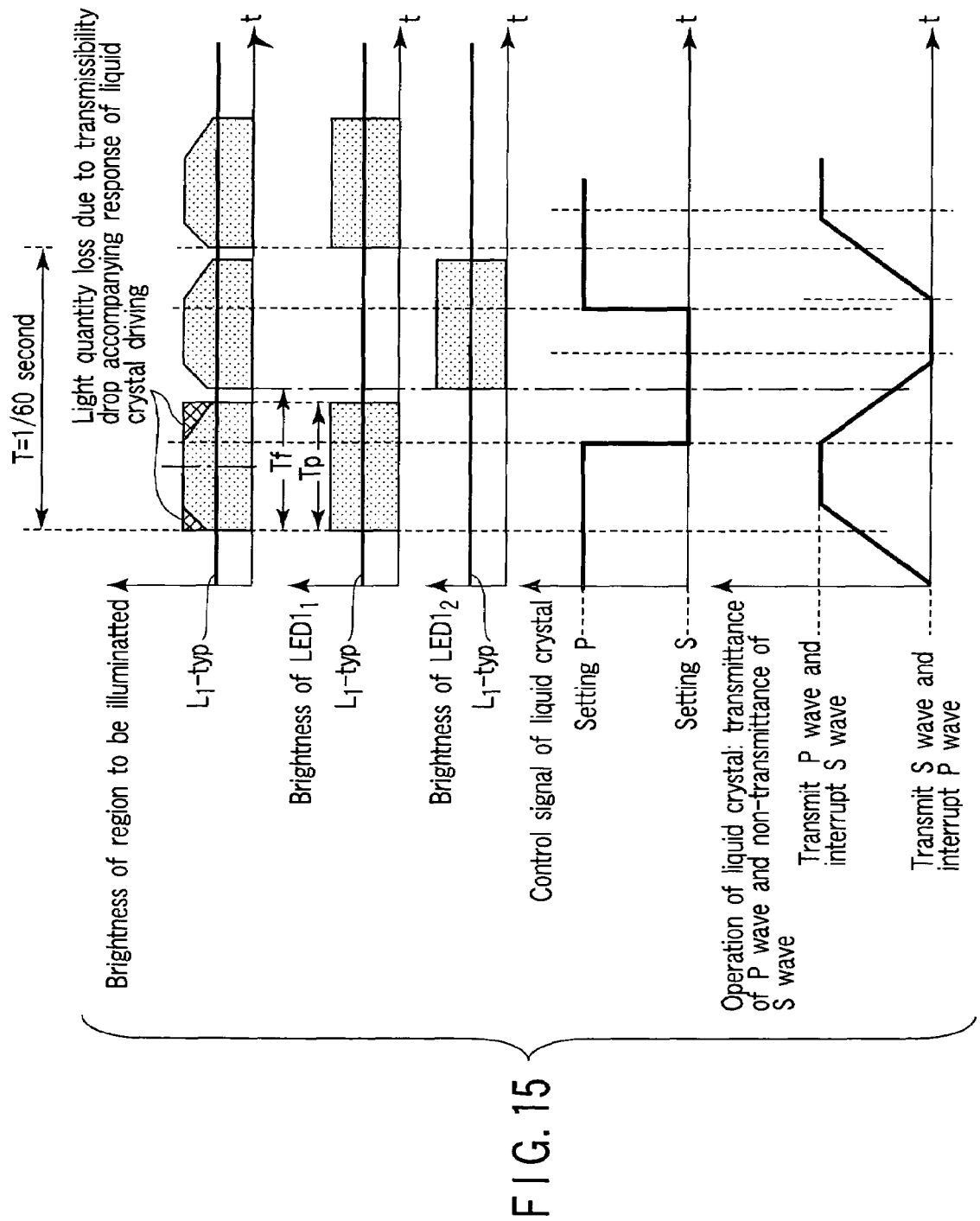
FIG. 15 is a timing chart of the illumination apparatus of FIG. 14.

FIG. 15 is a timing chart of the illumination apparatus configured in this manner. When the LEDs are arranged adjacent to each other, there is a problem that a package or the like around the LED chip obstructs dense arrangement, and much time is required for switching the LED in a case where the light transmissibility changing unit 12 is mechanically driven. On the other hand, in the second embodiment, the switching time of the LED is determined by a response speed of the liquid crystal 50, and a brighter illumination apparatus can be obtained by the light transmissibility changing unit 12 maintaining a time for which transmissibility is high with the high speed of the liquid crystal 50. It is to be noted that with regard to waveforms indicating the brightness of the region to be illuminated in FIG. 15, hatched portions indicate a light quantity loss by the transmissibility drop accompanying the response of the liquid crystal driving. When the response speed of the liquid crystal 50 is increased, the light quantity loss portion can be reduced.

Figure 16:
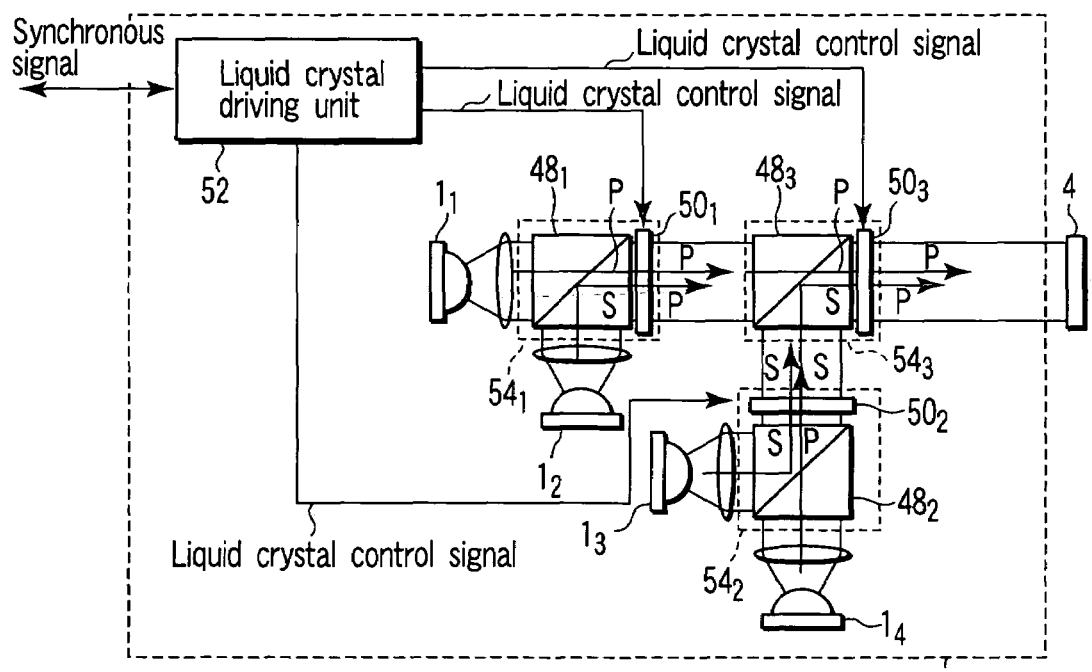
FIG. 16 is a diagram showing a configuration of a modification of the illumination apparatus of FIG. 16.

FIG. 16 is a diagram showing a configuration of an illumination apparatus which illuminates the region 2 to be illuminated using four LEDs $1_1$, $1_2$, $1_3$, $1_4$ according to a modification of the second embodiment. In this configuration, the light from four LEDs is switched to illuminate the region to be illuminated by a combination of the light transmission switching unit 54 and the optical system described in the configuration of FIG. 14. That is, three light transmission switching units $54_1$, $54_2$, $54_3$ are disposed, two light transmission switching units $54_1$, $54_2$ switch the light from two LEDs, and one light transmission switching unit $54_3$ switches output light. Moreover, liquid crystals $50_1$, $50_2$, $50_3$ of the light transmission switching units $54_1$, $54_2$, $54_3$ are controlled to guide the light of one LED to the region 2 to be illuminated.

Figure 17:
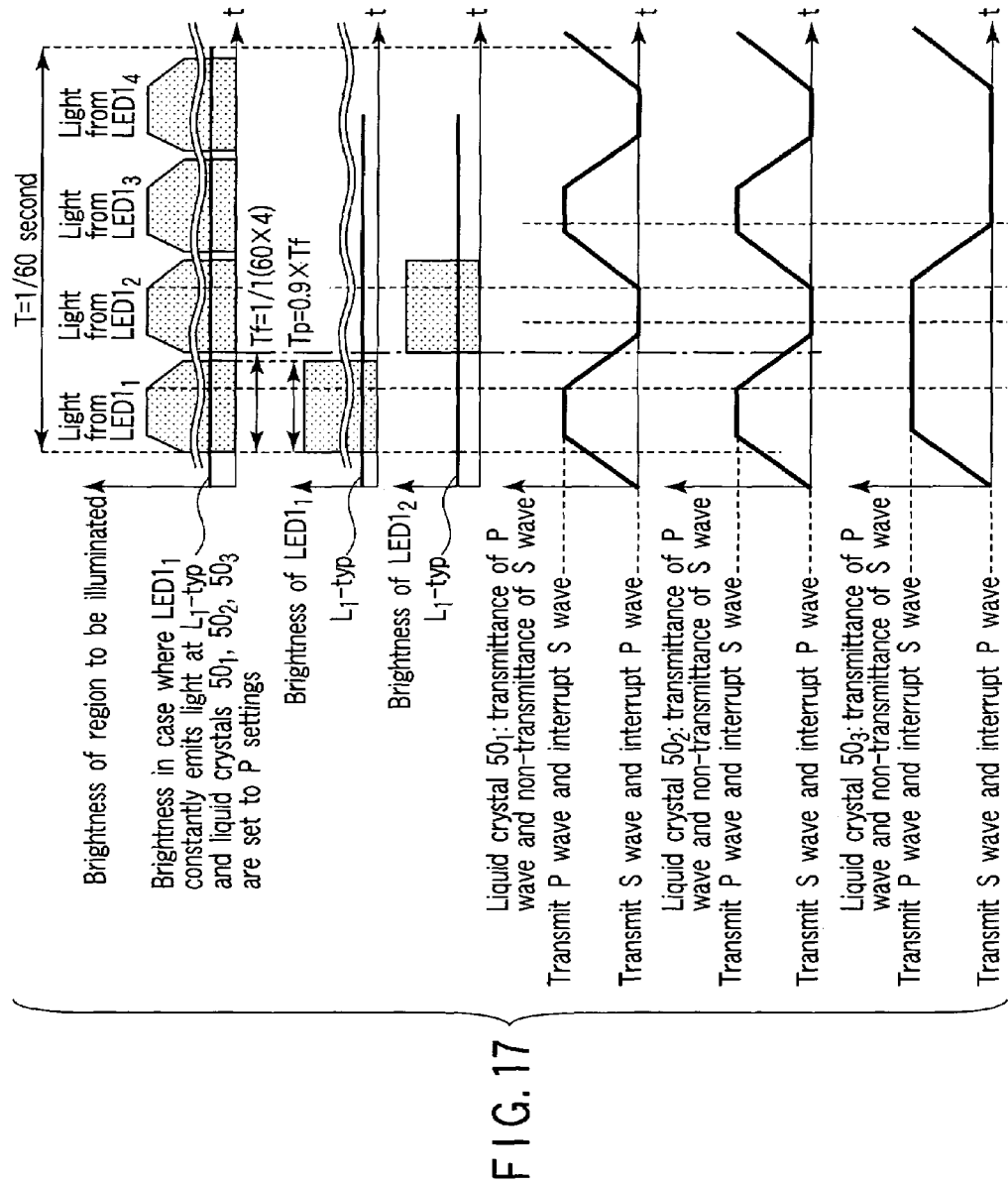
FIG. 17 is a timing chart of the illumination apparatus of FIG. 16.

FIG. 17 is a timing chart of an illumination apparatus configured in this manner. It is to be noted that waveforms concerning the LEDs $1_3$ and $1_4$ are omitted. The liquid crystals $50_1$, $50_3$ are fixed at P settings, and accordingly P-polarized light of the LED $1_1$ illuminates the region 2 to be illuminated. In this case, if the other LEDs $1_2$, $1_3$, $1_4$ emit the light, the region 2 to be illuminated cannot be illuminated. That is, the transmissibility is 0.

In a method of brightly illuminating the region 2 to be illuminated in this setting, the only LED $1_1$ can emit the light at the rated current I-typ of the stationary light emission, and illuminate the region:

$$P - typ = \sum_{j=1}^{3} \{L_j\text{-}typ \times K_j\text{-stop}\} \times T$$

$$= \{L_A\text{-}typ \times K_A\text{-stop}\} \times T$$

That is, the LED $1_1$ can emit the light at the rated current I-typ (brightness $L_1$-typ). To illuminate the region 2 to be illuminated at the transmissibility $K_1$-stop via the lens, PBS $48_1$, liquid crystal $50_1$, PBS $48_3$, and liquid crystal $50_3$, the region can be most brightly illuminated without driving the liquid crystals $50_1$, $50_3$, and the brightness of the region 2 to be illuminated in this case is P-typ.

On the other hand, when the respective liquid crystals $50_1$ to $50_3$ and the respective LEDs $1_1$ to $1_4$ are controlled as shown in FIG. 17, the region 2 to be illuminated can be illuminated with the following illuminative light quantity P. That is, the brightness of the region 2 to be illuminated is represented by the following equation, and the region can be set to be brighter than the above-described P-typ.

$$P = \int_0^T \{L_j(t) \times K_j(t)\} dt$$

$$= 2.3 \times L\text{-typ} \times 0.9 \times k_1\text{-stop} \times \left(\frac{3}{4}\right)$$

$$= 1.55 \times L\text{-typ} \times k_1\text{-stop}$$

$$= 1.55 \times P\text{-typ}$$

Where "2.3×L-typ" indicates the light emission amplification, "0.9" indicates the light emission ratio $T_p/T_f$, and "k1-stop×(3/4)" indicates the ratio of transmissibility drop accompanying response of liquid crystal driving.

Here, this equation will be described. Since $T/T_p$ is about 4, the light emission amplification is 2.3×L-typ from FIG. 6 corresponding to I-pulse=4×I-typ. The light emission ratio $T_p/T_f$ is set to 0.9 as shown in FIG. 17, and a ratio of a transmissibility drop accompanying a response of liquid crystal driving is 3/4 excluding a light quantity loss of about 1/4 in the figure in consideration of change characteristic of transmittances of the liquid crystals $50_1$, $50_2$, $50_3$ of FIG. 17, and is set to 3/4 with respect to $K_1$-stop.

In the second embodiment, as compared with the drop of the transmissibility accompanying the movement of the LED by the motor driving in the above-described first embodiment, the control is executed in such a manner as to increase the light quantity by the light emission amplification at the time of the pulse light emission exceeding the light quantity drop both by the light quantity drop accompanying the drop of the transmissibility relating to the response performance accompanying the driving of the liquid crystal, and the light quantity drop by non-illumination time.

The present invention has been described above based on the embodiments, but the present invention is not limited to the above-described embodiments and, needless to say, various modifications and applications are possible within the scope of the present invention. For example, an image projection apparatus configured by the illumination apparatus of the present invention may be applied to a configuring portion for projecting an image in a photographing exposure apparatus, a color copying machine, a color printer, a rewritable electronic paper recording apparatus and the like. Then, image forming means in which color adjustment is facilitated and which is therefore effective can be configured.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An illumination apparatus which applies light from light sources to a region to be illuminated, comprising:

a plurality of light emitting members which are the light sources;

an emitted light quantity control unit configured to control emitted light quantities of the plurality of light emitting members; and a light transmissibility changing unit configured to be capable of controlling transmissibility of each light path which transmits output light of the light emitting member to the region to be illuminated;

wherein:

the emitted light quantity control unit controls the emitted light quantity and the light transmissibility changing unit controls the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;

the emitted light quantity control unit is configured to control a light emission timing, a light emission time, and a driving current value in such a manner that three factors are correlated with one another in a case where the light emitting members are allowed to intermittently emit the light in accordance with the transmissibility obtained by periodically controlling the transmissibility of each light path by the light transmissibility changing unit; and assuming that the number of the light emitting members simultaneously emitting the light is n, the number of each of the n light emitting members simultaneously emitting the light is j, brightness of the n light emitting members at a pulse time supply current $I_j$-pulse is $L_j(t)$, a ratio of the light quantity of the light of the n light emitting members guided to the region to be illuminated via the light transmissibility changing unit is $K_j(t)$, brightness at a rated current $I_j$-typ in constant lighting of the n light emitting members is $L_j$-typ, a ratio of an optimum light quantity, at which the light transmissibility changing unit does not change with time to maximize the illuminative light quantity P-typ is $K_j$-stop, and a predetermined period is T, the emitted light quantity control unit is configured to control the light emission timing, the light emission time, and the driving current value in the plurality of light emitting members in such a manner as to satisfy the following condition equation:

$$P = \int_0^T \sum_{j=1}^n \{L_j(t) \times K_j(t)\} dt > P\text{-typ} = \sum_{j=1}^n \{L_j\text{-typ} \times K_j\text{-stop}\} \times T.$$

2. The illumination apparatus according to claim 1, wherein the emitted light quantity control unit is configured to control the light emission timing, the light emission time, and the driving current value in such a manner that these three factors are correlated with one another in such a manner as to satisfy the condition equation, when the illuminative light quantity increasing in accordance with the light emission amplification during the light emission of the light emitting member at a driving current larger than the rated current I-typ is set to be lager than the illuminative light quantity decreasing by a drop of the transmissibility accompanying the light transmissibility changing unit.

3. The illumination apparatus according to claim 2, wherein the light transmissibility changing unit includes a light take-in section configured to take in the light projected from the plurality of lit light emitting members while relatively moving with respect to the plurality of light emitting members, and the emitted light quantity control unit is configured to correlate and control three factors including the light emission timing, the light emission time, and the driving current value in accordance with the predetermined number n, arrangement interval of the plurality of light emitting members, a size of a light emitting face of the light emitting member, a relative movement speed of the light take-in section, and a size of a range-in which the output light is taken in.

4. The illumination apparatus according to claim 3, wherein the drop of the transmissibility accompanying the light transmissibility changing unit accompanies the relative movement of the light take-in section with respect to the plurality of light emitting members.

5. The illumination apparatus according to claim 2, wherein
the light transmissibility changing unit includes a light transmission switching section configured to transmit the light projected from the plurality of lit light emitting members, and
the emitted light quantity control unit is configured to correlate and control three factors including the light emission timing, the light emission time, and the driving current value in accordance with the predetermined number n, arrangement interval of the plurality of light emitting members, a size of a light emitting face of the light emitting member, and a switching timing of the light transmission switching section.

6. The illumination apparatus according to claim 5, wherein the light transmission switching section includes:
a polarized beam splitter on which the output light projected from the plurality of light emitting members strikes; and
a polarized wave face polarizing section configured to selectively polarize the light transmitted or reflected by the polarized beam splitter in a predetermined deflection direction.

7. The illumination apparatus according to claim 6, wherein the drop of the transmissibility accompanying the light transmissibility changing unit is caused by transmission loss of the light by the polarized beam splitter and that of the light accompanying the switching timing of the polarized wave face polarizing section.

8. An image projection apparatus comprising:
an illumination apparatus which applies light from light sources to a region to be illuminated, including:
a plurality of light emitting members which are the light sources;
an emitted light quantity control unit configured to control emitted light quantities of the plurality of light emitting members; and
a light transmissibility changing unit configured to be capable of controlling transmissibility of each light path which transmits output light of the light emitting member to the region to be illuminated, the emitted light quantity control unit controlling the emitted light quantity and the light transmissibility changing unit controlling the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;
an image display element disposed in the region to be illuminated; and
an optical projection system configured to enlarge and project an image on the image display element:
wherein:
the emitted light quantity control unit is configured to control a light emission timing, a light emission time, and a driving current value in such a manner that three factors are correlated with one another in a case where the light emitting members are allowed to intermittently emit the light in accordance with the transmissibility obtained by periodically controlling the transmissibility of each light path by the light transmissibility changing unit; and
assuming that the number of the light emitting members simultaneously emitting the light is n, the number of each of the n light emitting members simultaneously emitting the light is j, brightness of the n light emitting members at a pulse time supply current $I_j$-pulse is $L_j$ (t), a ratio of the light quantity of the light of the n light emitting members guided to the region to be illuminated via the light transmissibility changing unit is $K_j$ (t), brightness at a rated current $I_j$-typ in constant lighting of the n light emitting members is $L_j$-typ, a ratio of an optimum light quantity, at which the light transmissibility changing unit does not change with time to maximize the illuminative light quantity P-typ is $K_j$-stop, and a predetermined period is T, the emitted light quantity control unit is configured to control the light emission timing, the light emission time, and the driving current value in the plurality of light emitting members in such a manner as to satisfy the condition equation:

$$P = \int_0^T \sum_{j=1}^n \{L_j(t) \times K_j(t)\} dt > P\text{-typ} = \sum_{j=1}^n \{L_j\text{-typ} \times K_j\text{-stop}\} \times T.$$

9. The image projection apparatus according to claim 8, wherein the emitted light quantity control unit is configured to control the light emission timing, the light emission time, and the driving current value in such a manner that these three factors are correlated with one another in such a manner as to satisfy the condition equation, when the illuminative light quantity increasing in accordance with the light emission amplification during the light emission of the light emitting member at a driving current larger than the rated current I-typ is set to be lager than the illuminative light quantity decreasing by a drop of the transmissibility accompanying the light transmissibility changing unit.

10. The image projection apparatus according to claim 9, wherein
the light transmissibility changing unit includes a light take-in section configured to take in the light projected from the plurality of lit light emitting members while relatively moving with respect to the plurality of light emitting members, and
the emitted light quantity control unit is configured to correlate and control three factors including the light emission timing, the light emission time, and the driving current value in accordance with the predetermined number n, arrangement interval of the plurality of light emitting members, a size of a light emitting face of the light emitting member, a relative movement speed of the light take-in section, and a size of a range in which the output light is taken in.

11. The image projection apparatus according to claim 10, wherein the drop of the transmissibility accompanying the light transmissibility changing unit accompanies the relative movement of the light take-in section with respect to the plurality of light emitting members.

12. The image projection apparatus according to claim 9, wherein the light transmissibility changing unit includes a light transmission switching section configured to transmit the light projected from the plurality of lit light emitting members, and the emitted light quantity control unit is configured to correlate and control three factors including the light emission timing, the light emission time, and the driving current value in accordance with the predetermined number n, arrangement interval of the plurality of light emitting members, a size of a light emitting face of the light emitting member, and a switching timing of the light transmission switching section.

13. The image projection apparatus according to claim 12, wherein the light transmission switching section includes:

a polarized beam splitter on which the output light projected from the plurality of light emitting members strikes; and a polarized wave face polarizing section configured to selectively polarize the light transmitted or reflected by the polarized beam splitter in a predetermined deflection direction.

14. The image projection apparatus according to claim 13, wherein the drop of the transmissibility accompanying the light transmissibility changing unit is caused by transmission loss of the light by the polarized beam splitter and that of the light accompanying the switching timing of the polarized wave face polarizing section.

15. An illumination apparatus which applies light from light sources to a region to be illuminated, comprising:

a plurality of light emitting members which are the light sources;

emitted light quantity control means for controlling emitted light quantities of the plurality of light emitting members; and light transmissibility changing means for being capable of controlling transmissibility of each light path which transmits output light of the light emitting member to the region to be illuminated, wherein:

the emitted light quantity control means controls the emitted light quantity and the light transmissibility changing means controls the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;

the emitted light quantity control means is configured to control a light emission timing, a light emission time, and a driving current value in such a manner that three factors are correlated with one another in a case where the light emitting members are allowed to intermittently emit the light in accordance with the transmissibility obtained by periodically controlling the transmissibility of each light path by the light transmissibility changing means;

assuming that the number of the light emitting members simultaneously emitting the light is n, the number of each of the n light emitting members simultaneously emitting the light is j, brightness of the n light emitting members at a pulse time supply current $I_j$-pulse is $L_j$ (t), a ratio of the light quantity of the light of the n light emitting members guided to the region to be illuminated via the light transmissibility changing means is $K_j$ (t), brightness at a rated current $I_j$-typ in constant lighting of the n light emitting members is $L_j$-typ, a ratio of an optimum light quantity, at which the light transmissibility changing means does not change with time to maximize the illuminative light quantity P-typ is $K_j$-stop, and a predetermined period is T, the emitted light quantity control means is configured to control the light emission timing, the light emission time, and the driving current value in the plurality of light emitting members in such a manner as to satisfy the following condition equation:

$$P = \int_0^T \sum_{j=1}^n \{L_j(t) \times K_j(t)\}dt > P\text{-typ} = \sum_{j=1}^n \{L_j\text{-typ} \times K_j\text{-stop}\} \times T;$$

and the emitted light quantity control means is configured to control the light emission timing, the light emission time, and the driving current value in such a manner that these three factors are correlated with one another in such a manner as to satisfy the condition equation, when the illuminative light quantity increasing in accordance with the light emission amplification during the light emission of the light emitting member at a driving current larger than the rated current I-typ is set to be lager than the illuminative light quantity decreasing by a drop of the transmissibility accompanying the light transmissibility changing means.

16. An image projection apparatus comprising:

an illumination apparatus which applies light from light sources to a region to be illuminated, including:

a plurality of light emitting members which are the light sources;

emitted light quantity control means for controlling emitted light quantities of the plurality of light emitting members; and light transmissibility changing means for being capable of controlling transmissibility of each light path which transmits output light of the light emitting member to the region to be illuminated, the emitted light quantity control means controlling the emitted light quantity and the light transmissibility changing means controlling the transmissibility in such a manner that an illuminative light quantity P in the region to be illuminated during intermittent lighting of a predetermined number n of light emitting members which are some of the plurality of light emitting members at a driving current value larger than a rated current in a predetermined period T is larger than an illuminative light quantity P-typ in the region to be illuminated during constant lighting of the predetermined number n of light emitting members at a rated driving current I-typ in the predetermined period T;

an image display element disposed in the region to be illuminated; and an optical projection system configured to enlarge and project an image on the image display element;

wherein:

the emitted light Quantity control means is configured to control a light emission timing, a light emission time, and a driving current value in such a manner that three factors are correlated with one another in a case where the light emitting members are allowed to intermittently emit the light in accordance with the transmissibility obtained by periodically controlling the transmissibility of each light path by the light transmissibility changing means;

assuming that the number of the light emitting members simultaneously emitting the light is n, the number of each of the n light emitting members simultaneously emitting the light is j, brightness of the n light emitting members at a pulse time supply current $I_j$-pulse is $L_j(t)$, a ratio of the light quantity of the light of the n light emitting members guided to the region to be illuminated via the light transmissibility changing means is $K_j(t)$, brightness at a rated current $I_j$-typ in constant lighting of the n light emitting members is $L_j$-typ, a ratio of an optimum light quantity, at which the light transmissibility changing means does not change with time to maximize the illuminative light quantity P-typ is $K_j$-stop, and a predetermined period is T, the emitted light quantity control means is configured to control the light emission timing, the light emission time, and the driving current value in the plurality of light emitting members in such a manner as to satisfy the condition equation:

$$P = \int_0^T \sum_{j=1}^n \{L_j(t) \times K_j(t)\} dt > P\text{-typ} = \sum_{j=1}^n \{L_j\text{-typ} \times K_j\text{-stop}\} \times T;$$

and the emitted light quantity control means is configured to control the light emission timing, the light emission time, and the driving current value in such a manner that these three factors are correlated with one another in such a manner as to satisfy the condition equation, when the illuminative light quantity increasing in accordance with the light emission amplification during the light emission of the light emitting member at a driving current larger than the rated current I-typ is set to be lager than the illuminative light quantity decreasing by a drop of the transmissibility accompanying the light transmissibility changing means.

* * * * *